(12) United States Patent
Chawla et al.

(10) Patent No.: US 8,269,545 B2
(45) Date of Patent: Sep. 18, 2012

(54) FAIL SAFE ADAPTIVE VOLTAGE/FREQUENCY SYSTEM

(75) Inventors: Nitin Chawla, Noida (IN); Chittoor Parthasarathy, Noida (IN); Kallol Chatterjee, Kolkata (IN); Promod Kumar, Uttar Pradesh (IN)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 13/285,541

(22) Filed: Oct. 31, 2011

(65) Prior Publication Data
US 2012/0044005 A1    Feb. 23, 2012

Related U.S. Application Data

(62) Division of application No. 12/563,058, filed on Sep. 18, 2009, now Pat. No. 8,154,335.

(51) Int. Cl.
*H03H 11/26* (2006.01)
(52) U.S. Cl. ......... 327/262; 327/114; 327/165; 327/292
(58) Field of Classification Search ............ 327/291, 327/292, 165, 262, 113, 114
See application file for complete search history.

(56) References Cited

U.S. PATENT DOCUMENTS

| | | | |
|---|---|---|---|
| 4,246,517 A | 1/1981 | Dakroub | |
| 6,313,622 B1 | 11/2001 | Seki et al. | |
| 6,566,921 B1 * | 5/2003 | Boerstler et al. | 327/156 |
| 6,667,651 B2 | 12/2003 | Hashiguchi | |
| 6,697,952 B1 | 2/2004 | King | |
| 6,985,547 B2 * | 1/2006 | Uht | 375/354 |
| 7,116,142 B2 * | 10/2006 | Ferraiolo et al. | 327/149 |
| 7,119,523 B2 | 10/2006 | Nakai | |
| 7,245,167 B2 * | 7/2007 | Mahrla | 327/291 |
| 7,401,241 B2 | 7/2008 | Rotem et al. | |
| 7,401,243 B2 * | 7/2008 | Knepper et al. | 713/322 |
| 7,498,870 B2 | 3/2009 | Mair et al. | |
| 7,501,868 B2 | 3/2009 | Ito | |
| 7,576,569 B2 * | 8/2009 | Carpenter et al. | 327/14 |
| 7,583,555 B2 | 9/2009 | Kang et al. | |
| 7,667,504 B2 * | 2/2010 | Braun et al. | 327/113 |
| 7,768,303 B2 * | 8/2010 | Kajita | 326/46 |
| 7,844,020 B2 * | 11/2010 | Ichiyama | 375/359 |
| 7,848,169 B2 * | 12/2010 | Shikata | 365/226 |
| 7,965,133 B2 | 6/2011 | Anidjar et al. | |

(Continued)

OTHER PUBLICATIONS

Agarwal, Mridul, et al.: "Circuit Failure Prediction and Its Application to Transistor Aging," 25th IEEE VLSI Test Symposium (VTS'07), 0-7695-2812-0/07, $20.00, 2007 IEEE, 8 pages.

(Continued)

*Primary Examiner* — Thomas J Hiltunen
(74) *Attorney, Agent, or Firm* — Gardere Wynne Sewell LLP

(57) ABSTRACT

A system on chip (SoC) has a digital domain. An adaptive voltage/frequency scaling circuit includes a critical path replica circuit with respect to that digital domain. The critical path replica circuit generates a margin signal, and the adaptive voltage scaling circuit responds to the margin signal by decreasing bias voltage (and/or increasing clock frequency) applied to the digital domain of the system on chip so as to recover available margin. A fail-safe timing sensor is included within the digital domain of the system on chip. The timing sensor generates a flag signal when timing criteria within the digital domain are violated. The adaptive voltage scaling circuit responds to the flag signal by increasing the bias voltage (and/or decreasing the clock frequency) applied to the digital domain of the system on chip so as to implement a recovery operation.

20 Claims, 4 Drawing Sheets

U.S. PATENT DOCUMENTS

| | | | |
|---|---|---|---|
| 8,004,348 | B2 | 8/2011 | Ikenaga et al. |
| 2003/0197547 | A1 | 10/2003 | Mizuno et al. |
| 2009/0031155 | A1 | 1/2009 | Hofmann et al. |
| 2009/0044038 | A1* | 2/2009 | Lee .............................. 713/501 |
| 2009/0210184 | A1 | 8/2009 | Medardoni et al. |
| 2009/0278576 | A1 | 11/2009 | Chakravarty |
| 2010/0019834 | A1 | 1/2010 | Zerbe et al. |
| 2010/0117697 | A1* | 5/2010 | Kanno et al. ................. 327/158 |
| 2010/0153895 | A1 | 6/2010 | Tetelbaum et al. |
| 2010/0153896 | A1 | 6/2010 | Sewall et al. |
| 2010/0333057 | A1 | 12/2010 | Tang et al. |
| 2011/0047401 | A1* | 2/2011 | Werner ......................... 713/500 |
| 2011/0175658 | A1 | 7/2011 | Nomura |
| 2011/0187419 | A1 | 8/2011 | Ikenaga et al. |
| 2011/0187433 | A1 | 8/2011 | Baumann et al. |

OTHER PUBLICATIONS

Tschanz, James, et al.: "Adaptive Frequency and Biasing Techniques for Tolerance to Dynamic Temperature-Voltage Variations and Aging," ISSCC 2007 / Session 16 / Power Distribution and Management / 16.4, 2007 IEEE International Solid-State Circuits Conference, 1-4244-0852-0/07/$25.00, 2007 IEEE, pp. 292, 293, 604.

Mair, H., et al., "A 65-nm Mobile Multimedia Applications Processor with an Adaptive Power Management Scheme to Compensate for Variations," 978-4-900784-04-8, 2007 Symposium on VLSI Circuits Digest of Technical Papers, pp. 224-225.

Bowman, Keith A., et al, Energy-Efficient and Metastability-Immune Timing-Error Detection and Instruction-Replay-Based Recovery Circuits for Dynamic-Variation Tolerance, ISSCC 2008 / Session 22 / Variation Compensation & Measurement / 22.2, 2008 IEEE International Solid-State Circuits Conference, 978-1-4244-2011-7/08/$25.00, 2008 IEEE, pp. 402, 403, 623.

Drake, Alan, et al., "A Distributed Critical-Path Timing Monitor for a 65nm High-Performance Microprocessor," ISSCC 2007 / Session 22 / Digital Circuit Innovations / 22.1, 2007 IEEE International Solid-State Circuits Conference, 1-4244-0852-0/07/$25.00, 2007 IEEE, pp. 398-399.

* cited by examiner

FAIL SAFE ADAPTIVE VOLTAGE/FREQUENCY SYSTEM

CROSS-REFERENCE TO RELATED APPLICATION(S)

Pursuant to 35 U.S.C. §121, this application is a division of U.S. patent application Ser. No. 12/563,058, entitled "Fail Safe Adaptive Voltage/Frequency System", filed Sep. 18, 2009, the disclosure of which is hereby incorporated by reference for all purposes.

BACKGROUND OF THE INVENTION

1. Technical Field of the Invention

The present invention relates generally to system on chip (SoC) circuits and, more particularly, to a method and apparatus for maximizing energy efficiency of SoC circuit operation by dynamically operating the SoC circuit at the margins of acceptable voltage and/or frequency.

2. Description of Related Art

A system on chip (SoC) circuit is typically designed with "worst case" process and operating conditions (such as voltage and temperature) in mind. The actual or typical operating conditions for the SoC circuit are rarely at or even near such worst case conditions, and thus the SoC circuit most often operates with more than necessary safety margins. This is undesirable to some degree as it results in inefficiency. However, it is known to try and recover these available margins by operating the SoC circuit with reduced voltage (lower power) and/or increased frequency (increased throughput) for a given operating condition. Some dynamic control can be exercised over this operation. When trying to recover these available margins dynamically, however, instances may arise where the SoC circuit is placed into a near failure region. In such instances, the possibility of timing failures due to operating condition variation must be addressed through a recovery operation.

There is accordingly a need for a system which can not only adaptively control operating conditions of a SoC circuit (such as voltage and/or frequency) so as to achieve lower power for a given speed or higher speed for a given power, but also provide for fault-free operation and further predict failure and provide for fault-free recovery from such adaptive changes in operating conditions so as to prevent failure.

Reference is now made to FIG. 1 which shows a block diagram of a prior art adaptive voltage scaling (AVS) solution for a system on chip (SoC) circuit. The system on chip circuit 10 includes a digital domain 12 which receives a regulated (variable) voltage Vdd. The regulated (variable) voltage Vdd is generated by an adaptive voltage scaling circuit 14 (separate from the SoC circuit 10) that includes a voltage regulator 16. The output of the voltage regulator 16 is the regulated (variable) voltage Vdd applied to the digital domain 12 of the SoC circuit. A controller 18 outputs a control signal applied to the voltage regulator 16. The control signal sets the value of the regulated (variable) voltage Vdd.

The AVS circuit 14 further includes a critical path replica circuit 20 which is also powered by the regulated (variable) voltage Vdd output from the voltage regulator 16. The critical path replica circuit 20 is a standalone sensor for timing margins by replicating circuits and conditions in the digital domain of the SoC. Circuits of this type are well known to those skilled in the art (see, for example, Drake, et al., "A Distributed Critical-Path Timing Monitor for a 65 nm High-Performance Microprocessor", ISSCC 2007, Session 22, pages 398-399, FIG. 22.1.1, the disclosure of which is hereby incorporated by reference). The output of the critical path replica circuit 20 is a margin signal which is applied to the input of the controller 18. The controller responds to the margin signal by adjusting the regulated (variable) voltage Vdd applied to the digital domain 12 (for example, by lowering the voltage to recover available operating system margin).

Analogously, the controller may alternatively, or additionally, respond to the margin signal by adjusting the clock frequency of SoC circuit digital domain 12 operation (for example, by increasing clock frequency to recover available operating system margin). This adaptive frequency scaling (AFS) implementation is not shown in FIG. 1.

The circuit of FIG. 1, however, does have a deficiency. It is noted that some variations in operating performance can, and often do, exist between the critical path replica circuit 20 (within the separate AVS circuit 14) and the critical path circuits within the SoC circuit digital domain 12. Such variations may exist with respect to voltage, frequency, or both. As such, there exist variations between the available voltage or frequency margin estimated by the critical path replica circuit 20 and the actual margins of the SoC circuit digital domain 12 critical path circuits where the supply voltage and/or clock frequency adjustments are actually applied. The variability experienced between the estimated and actual margins for a given SoC circuit may be due to one or more of the following factors: a) static variability due to spatial differences in circuit characteristics; b) dynamic variability due to differences between the actual circuit and the sensor circuit caused by supply network, local temperature variation and local ageing; c) real time operation differences.

Ideally, it would be beneficial to exercise the critical paths of the SoC circuit to validate that the margins after adaptive voltage scaling (as controlled by the critical path replica) are indeed sufficient. However, the prior art discussed above does not provide a mechanism for exercising the critical paths of the SoC circuit deterministically during operation. The AVS solution of the prior art accordingly cannot be said to be fail safe under an actual low energy operating point. The controller 18 may instruct the voltage regulator 16 to apply a regulated (variable) voltage Vdd (based on the margin signal output from the critical path replica circuit) whose level is sufficient for satisfying critical path replica circuit 20 operations but is insufficient to properly operate the actual critical path circuits within the digital domain 12 of the SoC circuit. Inadvertent failure may result. Likewise, controller 18 may select a clock frequency (based on the margin signal output from the critical path replica circuit) that is sufficient for critical path replica circuit 20 operations but insufficient to properly operate the critical path circuits of the digital domain 12 for the SoC circuit.

There is a need in the art to address the foregoing deficiencies.

SUMMARY OF THE INVENTION

In an implementation, a system comprises: a system on chip (SoC) having a digital domain; an adaptive voltage scaling circuit including a critical path replica circuit with respect to the digital domain, the critical path replica circuit generating a margin signal, the adaptive voltage scaling circuit responding to the margin signal to vary a bias voltage applied to the digital domain of the system on chip; and a fail-safe timing sensor within the digital domain of the system on chip, the timing sensor generating a flag signal; wherein the adaptive voltage scaling circuit responds to the flag signal to vary the bias voltage applied to the digital domain of the system on chip.

A corresponding process comprises: performing adaptive voltage scaling to vary a bias voltage applied to a digital domain of a system on chip (SoC) in response to margin information provided by a critical path replica circuit; sensing timing margin within the digital domain of the system on chip; generating a flag signal responsive to a sensed violation of a safe timing margin on the SoC digital domain resulting from the variation in applied bias voltage; varying the bias voltage applied to the digital domain of the system on chip in response to the flag signal.

In another implementation, a system comprises: a system on chip (SoC) having a digital domain; an adaptive frequency scaling circuit including a critical path replica circuit with respect to the digital domain, the critical path replica circuit generating a margin signal, the adaptive frequency scaling circuit responding to the margin signal to vary a clock frequency applied to the digital domain of the system on chip; and a fail-safe timing sensor within the digital domain of the system on chip, the timing sensor generating a flag signal; wherein the adaptive frequency scaling circuit responds to the flag signal to vary the clock frequency applied to the digital domain of the system on chip.

A corresponding process comprises: performing adaptive frequency scaling to vary a clock frequency applied to a digital domain of a system on chip (SoC) in response to margin information provided by a critical path replica circuit; sensing timing margin within the digital domain of the system on chip; generating a flag signal responsive to a sensed violation of a safe timing margin on the SoC digital domain resulting from the variation in applied clock frequency; varying the clock frequency applied to the digital domain of the system on chip in response to the flag signal.

In another embodiment, a process for guided fail-safe voltage or frequency scaling comprises: monitoring a network of timing sensors in a digital domain, each timing sensor being set with individual timing margins whose violation results in the generation of a flag signal; applying a voltage or frequency scaling direction and adjustment step size in response to a generated flag signal, wherein the voltage or frequency scaling direction and adjustment step size are set for a recovery operation uniquely associated with each of the timing sensors in the digital domain.

In another embodiment, a process comprises: selecting a sufficient set of end points within a digital domain of a system on chip to be monitored by fail safe in-situ sensors; exploiting the end points under different circuit or application scenarios so as to excite the critical path terminating in these end points; sensing timing margin within the digital domain of the system on chip using the un situ sensors; generating a flag signal responsive to a sensed violation of a safe timing margin on the system on chip digital domain.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
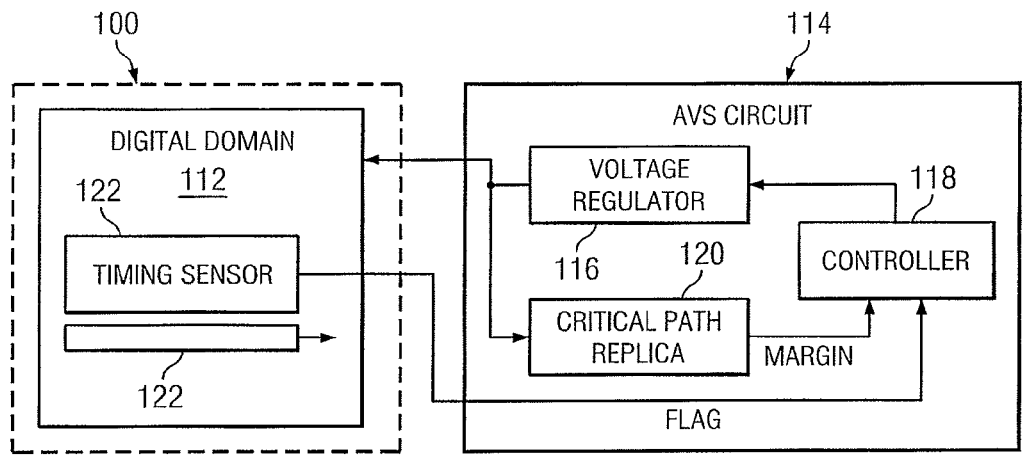
FIG. 2 is a block diagram of an adaptive voltage scaling (AVS) solution for a system on chip circuit.

Reference is now made to FIG. 2 which shows a block diagram of an adaptive voltage scaling (AVS) solution for a system on chip circuit. The system on chip (SoC) circuit 100 includes a digital domain 112 which receives a regulated (variable) voltage Vdd. The regulated (variable) voltage Vdd is generated by an adaptive voltage scaling circuit 114 (separate from the SoC circuit 100) including a voltage regulator 116. The output of the voltage regulator 116 is the regulated (variable) voltage Vdd applied to the digital domain 112. A controller 118 outputs a control signal applied to the voltage regulator 116. The control signal sets the value of the regulated (variable) voltage Vdd.

The AVS circuit 114 further includes a critical path replica circuit 120 which is also powered by the regulated (variable) voltage Vdd output from the voltage regulator 16. The critical path replica circuit 120 provides a replica of a critical path within the digital domain and is a standalone sensor for timing margins that is well known in the art (see, for example, Drake, et al., "A Distributed Critical-Path Timing Monitor for a 65 nm High-Performance Microprocessor", 17 ISSCC 2007, Session 22, pages 398-399, FIG. 22.1.1, disclosure of which is hereby incorporated by reference). The output of the critical path replica circuit 120 is a margin signal which is applied to the input of the controller 118. The controller responds to the margin signal by adjusting the regulated (variable) voltage Vdd applied to the digital domain 112 (for example, by lowering the voltage to recover available operating system margin).

Figure 3:
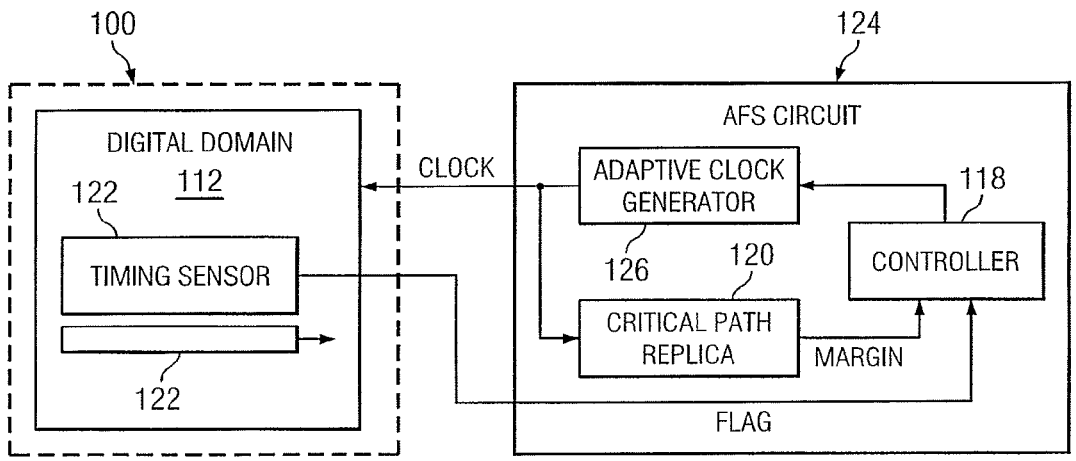
FIG. 3 is a block diagram of an adaptive frequency scaling (AFS) solution for a system on chip circuit.

Reference is now made to FIG. 3 which shows an analogous implementation for an adaptive frequency scaling (AFS) circuit 124 solution. In the FIG. 3 solution, the controller 118 may alternatively, or additionally, respond to the margin signal from the critical path replica circuit 120 by adjusting the frequency of SoC circuit digital domain 112 operation (for example, by increasing clock frequency output from an adaptive clock generator 126) so to recover available operating system margin. The critical path replica circuit 120 in this implementation also has a well known circuit configuration (such as that taught by the Drake, et al., "A Distributed Critical-Path Timing Monitor for a 65 nm High-Performance Microprocessor" article)).

The SoC circuit 100 includes a number of in situ fail-safe timing sensors 122 associated at the very least with the digital domain 112. An example of one such timing sensor 122, referred to as a "canary" sensor because it fails prior to the digital domain circuit failing (compare to the use of canary birds by miners in mining operations to warn of harmful gases), is described herein. The output from the in situ timing sensors 122 is provided to the controller 118 in addition to the margin signal input from the critical path replica circuit 120. As such, the sensor 122 input provides information used by the controller 118 to adjust the regulated (variable) voltage Vdd applied to the digital domain 112 (for example, by increasing the voltage as a recovery mechanism). Analogously, as shown in FIG. 3 for an adaptive frequency scaling (AFS) circuit 124 solution, the controller 118 may alternatively, or additionally, respond to the sensor 122 input by adjusting the frequency of SoC circuit digital domain 112 operation (for example, by decreasing clock frequency of the adaptive clock generator 126 as a recovery mechanism).

The sensor 122 within the digital domain 112 of the SoC circuit 100 will typically comprise a network of individual sensors spaced across the digital domain. The outputs of those individual sensors can be logically combined into a single sensor (flag) signal for application to the controller 118, or each individual sensor output flag can be supplied to and evaluated by the controller 118. The flag(s) which is(are) received by the controller 118 can be used to provide additional debug information for the purpose of determining critical point(s) of failure with respect to portions of the digital domain associated with each sensor 122.

Figure 1:
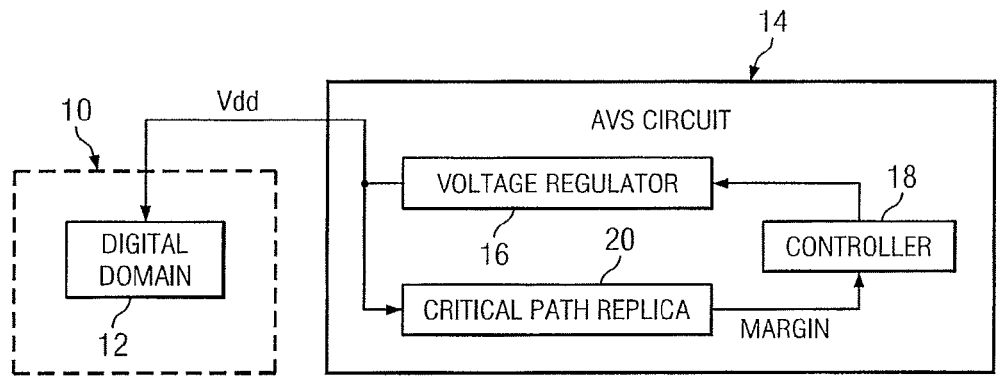
FIG. 1 is a block diagram of a prior art adaptive voltage scaling (AVS) solution for a system on chip circuit.
Figure 5:
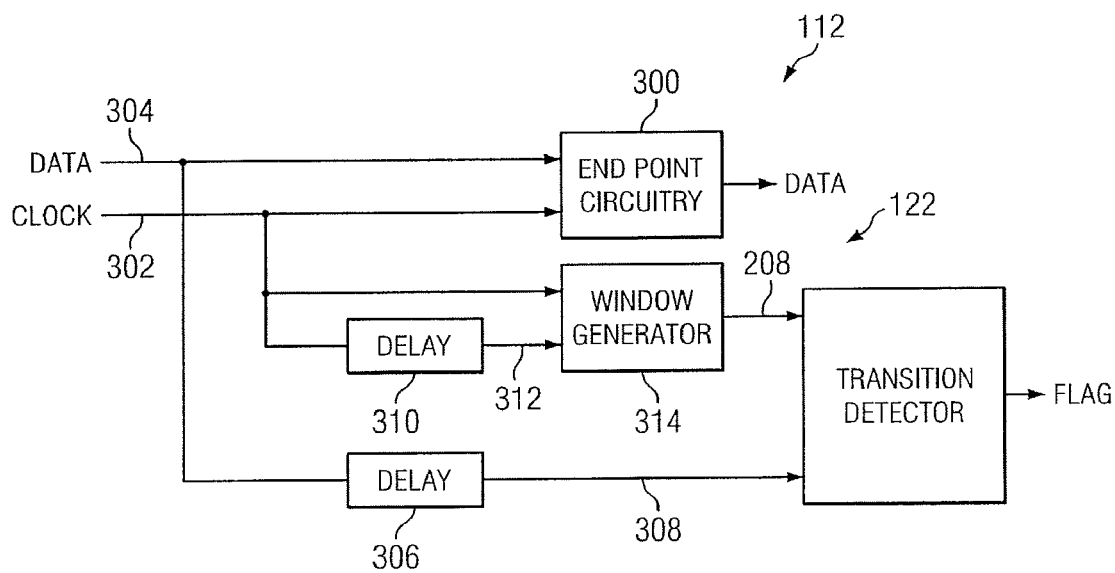
FIG. 5 is a circuit diagram of the critical path end point monitor circuit fail-safe sensor whose operation is shown in FIG. 4.

Each fail-safe timing sensor 122 is a critical path end point monitor circuit which can be used to forecast failure (see, FIG. 5 and discussion herein). Advantageously, each fail-safe timing sensor 122 is non-intrusive in terms of design architecture. The fail-safe timing sensors 122, as needed, can be introduced into the SoC circuit network relatively late in the design flow without difficulty. Additionally, because the included fail-safe timing sensors 122 are in situ provided within and across the SoC circuit 100 digital domain 112, the spatial and temporal variation issues noted above with respect to the prior art FIG. 1 solution and the sole use of a critical path replica circuit are addressed. The information provided by the fail-safe timing sensors 122 further can prevent actual failure from occurring as a result of AVS and/or AFS action to adaptively control operating conditions of the SoC circuit.

In an implementation where a network of individual fail-safe timing sensors 122 is provided, and further where each individual sensor flag output is supplied to and evaluated by the controller 118, any violation of safe timing margin on the SoC circuit digital domain 112 can be flagged by the controller 118 (and recorded in memory). Additionally, when a fail-safe timing sensor 122 detects occurrence of a potential time margin violation due to AVS or AFS operation, that occurrence can be stored by the controller 118 (for example, in memory) so as to enable location detection for purposes of debug operation.

The information provided by the fail-safe timing sensors 122 can be used by the controller 118 to implement a fault prevention operating mode. In this configuration, any indication from an included sensor 122 of an actual or potential violation of safe timing margin on the SoC circuit digital domain 112 can over-ride (or supplement) the margin signal information supplied by the critical path replica circuit 120 in the controller 118 and prevent further changes from being made, or reverse previously made changes, as to voltage (regulator 116) or clock frequency (generator 126). In this way, a fault-prevention mode of operation is provided which nonetheless maximizes energy efficiency at a given throughput.

In an implementation where a network of individual fail-safe timing sensors 122 is provided, and further where each individual sensor output is supplied to and evaluated by the controller 118, the prevention margins associated with each sensor 122 can be set to different values. An advantage of this configuration is that the controller 118 can account for differences in spatial and temporal properties within the SoC circuit 110. The prevention margin value of sensor 122 at one given location or time may be indicative of an actual or potential failure, while that same value at another location or time may not be indicative of an actual or potential failure (or otherwise may be tolerable). These differences can be accommodated by the controller 118 and used to provide for better energy efficiency at a given throughput. Variability related performance issues within the digital domain 112 of the SoC circuit 100 can be accurately countered without affecting design architecture.

Figure 4:
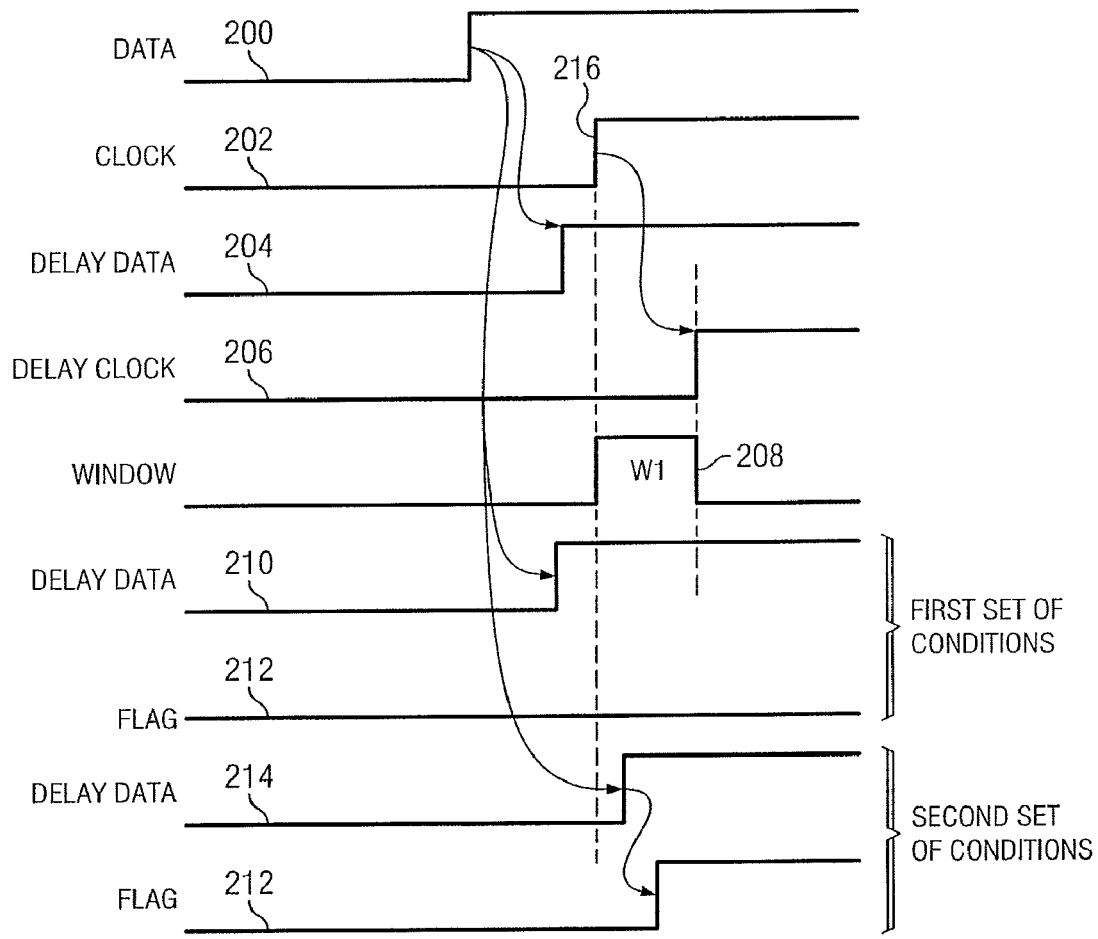
FIG. 4 illustrates operation of the critical path end point monitor circuit sensor.

Reference is now made to FIG. 4 which illustrates operation of the critical path end point monitor circuit for the fail-safe timing sensor 122. Signal 200 is the data signal on an actual data path within the digital domain 112. Signal 202 is the clock signal on an actual clock path within the digital domain. Signal 204 is the data signal 200 delayed though a delay chain. Signal 206 is the clock signal 202 delayed though a delay chain. The low to high transition of the clock signal 202 triggers the opening of a transition detection window 208 having a certain width W1. The window 208 closes with the high to low transition of the delayed clock signal 206. The occurrence of the low to high transition of the delayed data signal 204 outside of the transition detection window 208 is indicative of acceptable operation. This is shown for a first set of operating conditions (voltage and/or frequency) with signal 210 which is the delayed data signal 200 having a low to high transition prior to the opening of the transition detection window 208, with signal 212 being a flag signal remaining low and thus indicating no actual or potential failure.

As voltage (in AVS) and or clock frequency (in AFS) are manipulated, the relationship between the location of the low to high transition of the delayed data signal and the transition detection window 208 will change. The occurrence of the low to high transition of the delayed data signal 204 within the transition detection window 208 is indicative of unacceptable operation and possible failure. This is shown for a second set of operating conditions (voltage and/or frequency) with signal 214 which is the delayed data signal 200 having a low to high transition after the opening of the transition detection window 208, with the transition from low to high in signal 212 being a flag signal indicative of an actual or potential failure.

Thus, the sensor 122 is triggered on the current clock edge 216. This is preferred over triggering on the previous (high to low) clock edge or even worse on the previous low to high clock edge. This triggering configuration eliminates any effect of frequency or duty cycle change in location of the transition detection window 208. The implementation is further robust as to variations: any variation in the size W1 of the window 208 is only the small delay referenced from the current clock edge. In absolute terms, this translates to a small difference. The circuit for the sensor 122 is also area and power efficient (since the required delays are small).

It is intended that the transition (for example, from low to high) in flag signal 212 be indicative of a potential (as opposed to actual) failure. In other words, the flag signal 212 transitions to an active state as operating conditions are changing well in advance (in terms of voltage or frequency) of the point where the operating conditions might produce faulty circuit operation. By configuring sensor operation in this manner, fail-safe operation is provided.

Reference is now made to FIG. 5 which illustrates a circuit diagram of the fail-safe timing sensor 122. A clock line 302 and a data line 304 supply a clock signal 202 and a data signal 200, respectively, to end point circuitry 300 within the digital domain 112, the end point circuitry outputting data for further processing in the digital domain 112. The data line 304 is connected to the output of a critical path logic circuit (see, circuit 350 of FIGS. 6 and 7). The timing sensor 122 is also connected to clock line 302 and data line 304. A first delay unit 306 is connected to the data line 304 to receive and delay the data signal 200. The first delay unit 306 outputs the delayed data signal 204 on first delay line 308. A second delay unit 310 is connected to the clock line 302 to receive and delay the clock signal 202. The second delay unit 310 outputs the delayed clock signal 206 on second delay line 312. The delays introduced in the clock and data signals by the first and second delay units 306 and 310 are typically matched. They can be set to independent values, not necessarily the same, depending on the additional safety margins that is intended to be introduced. This implementation ensures that the check between the clock and the data occurs at the current clock edge and that the check does not depend on any previous clock edges.

A window generator circuit 314 (comprising, for example, a set-reset flip-flop) receives the un-delayed clock signal 202 on clock line 302 and the delayed clock signal 206 on second delay line 312. The window generator circuit 314 generates the transition detection window 208. Thus, the clock and its delayed version are used to generate a timing window.

A transition detector circuit 316 (comprising, for example, a combinational logic circuit) receives the delayed data signal 204 on first delay line 308 and the generated transition detection window 208. The transition detector circuit 316 outputs a flag signal 212 whose logic value is active if the delayed data signal 204 on first delay line 308 changes logic state within the generated transition detection window 208 (for example, when the window signal is logic high). Thus, the transition detector circuit 316 can determine whether any edge (low to high or high to low) of the delayed data passes (occurs) within the window.

The circuit of FIG. 5 shows the configuration of a single sensor 122. Multiple circuits like that shown in FIG. 5 are typically provided across the digital domain. In such a configuration, a sensor 122 is installed at selected ones of the critical path end points throughout the digital domain. Through programming operations, the delays introduced by the first and second delay units 306 and 310 can be individually set, thus effectuating selection of individual timing windows for each sensor and individual conditions for generating an active flag.

In response to a transition (for example, from low to high) in flag signal 212 (which is indicative of an actual or potential failure), the controller 118 implements a recovery operation. In AVS mode, the controller 118 controls the voltage regulator 116 to raise the voltage Vdd. In AFS mode, the controller 119 controls the clock generator 126 to lower the clock frequency. The adjustments by the regulator 116 and/or generator 126 typically happen over the course of many clock cycles.

In certain situations this many clock cycle delay may not be satisfactory. Thus, the digital domain 112 of FIGS. 2 and 3 may further be configured such that critical paths therein include a high speed option which is temporarily activated in response to the flag signal 212. This high speed option for the critical path circuits is typically present by design (but their presence does not change the design architecture). For example, this high speed option can be obtained by the critical path circuits within the digital domain 112 (i.e., the cells therein) having an alternative high speed capability which can be triggered by an external signal. The external signal in the present case is the flag signal 212 at an active logic level. When the flag signal 212 is active logic, the high speed capability is enabled which will cause the speed through the critical path circuits to be increased. The high speed capability for the critical path circuits is not typically enabled during normal operation because the circuits are not well optimized for overall performance (such as with power consumption in high speed mode). However, in the operating scenario described herein, optimized performance is not a concern. Rather, the concern is to temporarily and locally boost the speeds through the critical path circuits until such time as the AVS and/or AFS operation has moved to safer biasing voltage and/or clock frequency.

Figure 6:
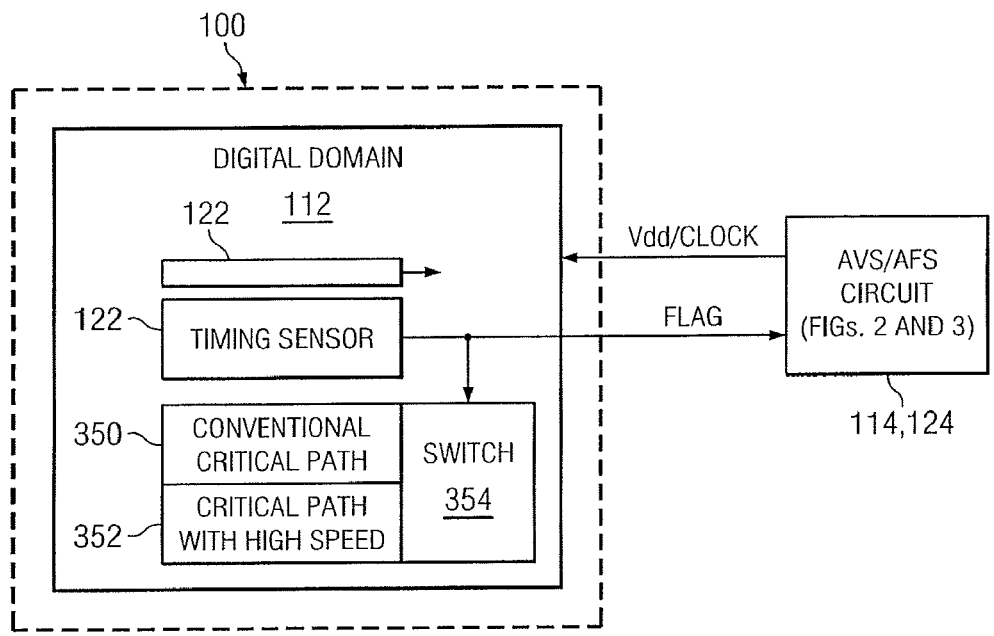
FIG. 6 is a block diagram of a system on chip (SoC) digital domain with high speed option critical path circuits.

Reference is now made to FIG. 6 which illustrates a block diagram of a system on chip (SoC) digital domain with high speed option critical paths. The digital domain 112 of the system on chip (SoC) 100 includes a timing sensor 122 as described above which generates a flag signal (indicative of an actual or potential failure). The AVS/AFS system (114 and/or 124) responds to the flag signal as described above to control the included voltage regulator in AVS mode to raise the voltage Vdd and/or to control the included clock generator in AFS mode to lower the clock frequency. The digital domain 112 includes a number of critical path circuits 350. That critical path circuit 350 is further configured with a high speed option 352. A switch 354 is provided to switch between conventional (or regular) critical path circuit 350 operation and the high speed option 352. The switch is controlled by the flag signal generated by the timing sensor 122.

At the point where the AVS/AFS system (114 and/or 124) is working to recover available margin (in accordance with the critical path replica margin signal), the actual critical path circuits of the digital domain 112 may be placed in a near failure situation with reduced margin. This is detected by the fail-safe mode of the timing sensor 122 which generates an active logic flag signal indicating that a recovery (from potential failure) operation should be instigated. Responsive to this flag signal, the AVS/AFS system (114 and/or 124) will respond over some period of time (with higher voltage or lower clock frequency). To reduce the possibility of failure during this recovery time period, the switch 354 responds to the active logic flag signal by switching the critical path circuits 350 within the digital domain into their high speed option 352. This temporarily boosts the speeds through the critical path circuits 350 until the system moves to a safe voltage bias or clock frequency. The actual realization of the high speed option 352 for the critical path circuits 350 of the digital domain 112 can be made in various ways, such as by having high drive cells or by changing the threshold voltage of the critical path circuits 350.

Figure 7:
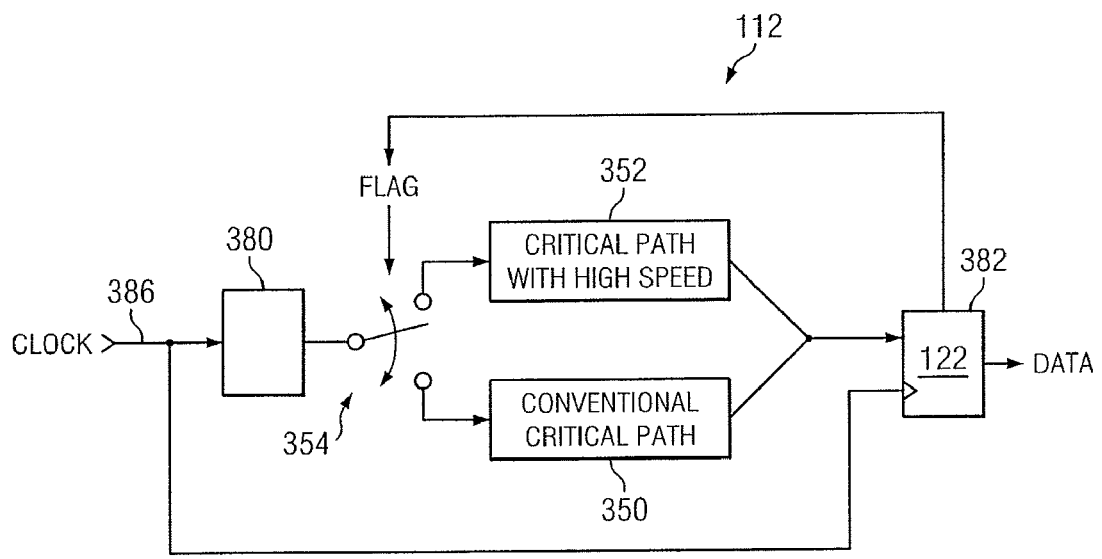
FIG. 7 is a block diagram of an exemplary design for implementing critical path circuits with a switched in high speed option.

Reference is now made to FIG. 7 which shows a block diagram of an exemplary design for implementing critical path circuits with a switched in high speed option. A clock signal 386 is applied to first circuitry 380. This first circuitry 380 comprises a logic circuit (for example, a logic gate) operable to excite the critical path circuit. The output of first circuitry 380 is applied to the input of switch 354. Switch 354 operates responsive to the flag signal (which is indicative of an actual or potential failure as detected by timing sensor 122). If no failure, the output of circuitry 380 passes through switch 354 to the conventional critical path circuit 350. Conversely, if the flag signal is active (indicating an actual or potential failure), the output of circuitry 380 passes through switch 354 to the critical path circuit with high speed option 352. The outputs of the circuits 350 and 352 are applied to the data input of a clocked output circuit 382 which also receives the clock signal 386. The circuit 382 comprises an end point circuit with a timing sensor such as the circuitry 122 shown in FIG. 5. This circuit 382 generates the flag which is fed back to control the switch 354 to locally implement (i.e., within the portion of the digital domain associated with the critical path circuit) the high speed recovery operation. This flag is further sent to the AVS/AFS circuitry as described above to implement a more global recovery operation.

It will be understood that the critical path circuit with high speed option 352 need not be a physically distinct circuit from the conventional critical path circuit 350 (although this is a possibility). Rather, the critical path circuit with high speed option 352 may simply refer to the presence of high drive cells or changeable threshold voltage circuitry within the critical path circuit 350 that can be switchably activated in response to the flag signal.

As discussed above, the network of individual fail-safe timing sensors 122 can have individual sensor outputs with prevention margins (the windows and conditions associated with each sensor 122) being set to different values. Thus, multiple windows and multiple flags can be used by the controller 118 to guide voltage and/or clock frequency adjustment (on a local or global basis within the digital domain). The adjustments at issue concern both scaling direction and step size (with direction and step size combinations being uniquely associated with each end point timing sensor 122). The sizing of windows can be made in a temporally sequential manner, or different window sizes can be sampled at the same time, or the window sizes can be spatially varied. These are various ways that could be employed to guide the making of adaptive adjustments.

Figure 8:
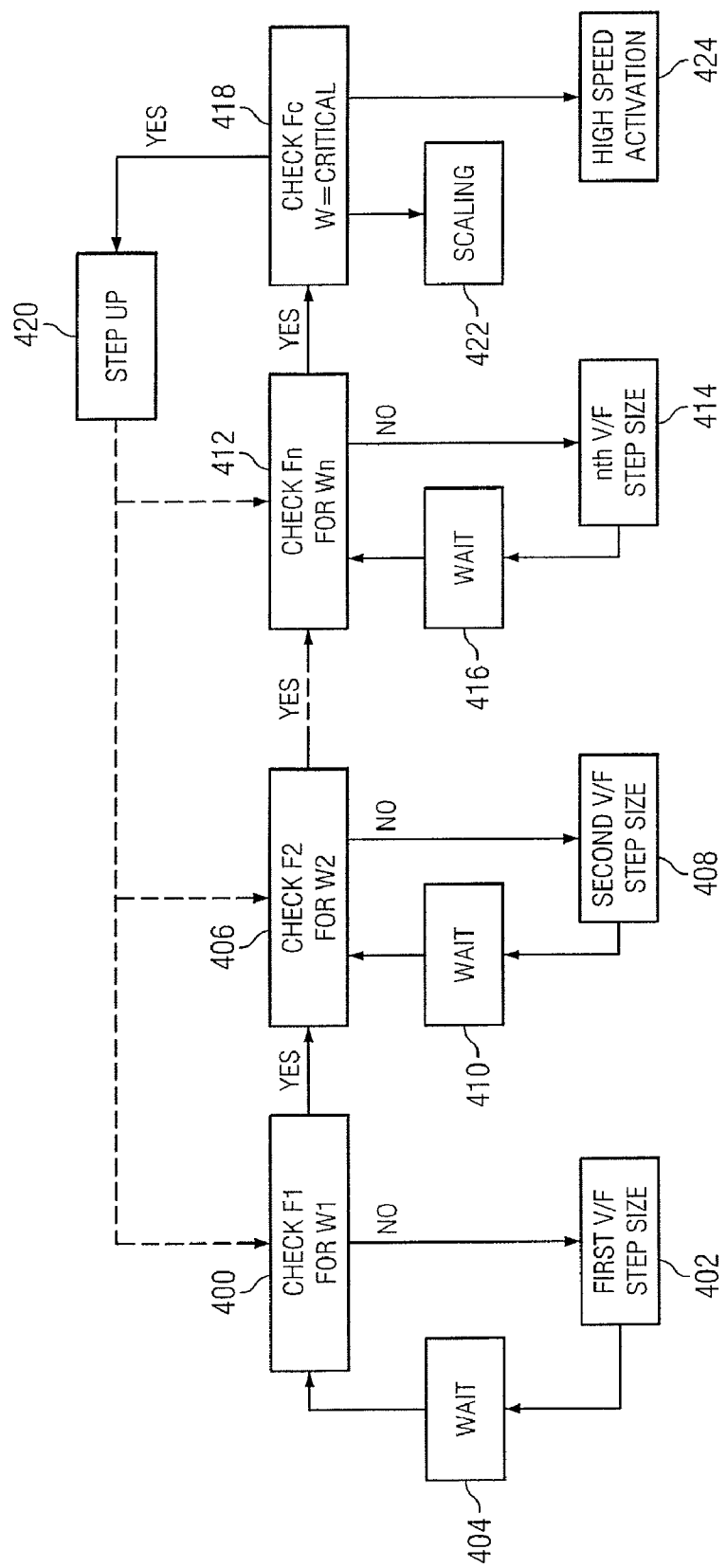
FIG. 8 is a flow diagram for guided fail-safe scaling for a multi-window and multi-flag implementation.

Reference is now made to FIG. 8 which shows a flow diagram for an exemplary guided fail-safe scaling for a multi-window and multi-flag implementation. The guided adaptive system described ensures that the adaptability of the system is made proportional to margins that are available.

The process starts in step 400 where the state of a first flag F1 associated with a first window W1 is checked. If that first flag F1 is not active, then a first state 402 associated with implementation of a first voltage/frequency step size is implemented by the controller 118. The process then enters a first programmable waiting period 404 and returns to step 400 when the first programmable waiting period 404 expires. If the first flag F1 is active for window W1, the process moves to step 406 to check if the second flag F2 associated with a first window W1 is active. If not, then a second state 408 associated with implementation of a second voltage/frequency step size is implemented by the controller 118. The process then enters a second programmable waiting period 410 and returns to step 406 when the second programmable waiting period 410 expires. If the first flag F1 is active for window W1 and the second flag is active for window W2, the process moves to step 412 to check if the nth flag Fn associated with an nth window Wn is active. The sizing of the windows in this implementation will be determined by, for example, the voltage sensitivities of the delay. In turn, these windows can determine the speed at which the adaptive adjustments are made. It will be understood that any number of intervening checks (and associated states and waits) could be provided before reaching step 412. If not, then an nth state 414 associated with implementation of an nth voltage/frequency step size is implemented by the controller 118. The process then enters an nth programmable waiting period 416 and returns to step 406 when the second programmable waiting period 410 expires. If the first through nth flags F1-Fn are active for windows W1-Wn, the process moves to step 418 to check if the critical flag Fn associated with a critical window Wc is active. The critical window will be related to the necessary uncertainty margin that needs to be maintained between the clock and the data. If so, then the step up state 420 is entered and the adaptive voltage or frequency is stepped to a higher or lower value, respectively, so as to avoid failure. In association with this operation, scaling of voltage bias and frequency may be implemented (state 422) or high speed critical path circuits may be activated (step 424). If no in step 418, then the system is in good operating condition and no adjustments are needed. Following the step up operation of step 420, the process may return to any one of the steps 400, 406 or 412, and the process repeats.

It is important to recognize that exercise of the critical paths at the end points that are monitored using fail-safe sensors is not always ensured during operation. The end points to be monitored are selected a priori by using the available timing margin distribution of the design. Techniques related to bimodal slack distribution or slack recovery from end points which does not lead to a significant area increase can be deployed to minimize the end points to be monitored. Once a sufficient set of end points which would be monitored by fail safe in-situ sensors are identified they have to be exploited under different circuit or application scenarios to excite the critical path terminating in these end points. Pattern replacement during known operation phases like reset initialization states or any specific power sequencing states can be used to replace the known but non critical (in terms of timing) computation by critical path computations. Other access methods through direct access, inbuilt scan or logic built-in self test (BIST) can also be used to exercise the critical path deterministically during idle or known operational phases. The flag outputs applied to the controller 118 are then monitored to ensure the correct flags are set responsive to the corresponding testing values of voltage and/or frequency.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system, comprising:
a system on chip (SoC) having a digital domain;
an adaptive frequency scaling circuit including a critical path replica circuit with respect to the digital domain, the critical path replica circuit configured to generate a margin signal, the adaptive frequency scaling circuit configured to vary a clock frequency applied to the digital domain of the system on chip in response to the margin signal; and
a fail-safe timing sensor for a critical path circuit within the digital domain of the system on chip, the timing sensor operable to sense a time margin violation at the critical path circuit resulting from adaptive frequency scaling circuit variation of the clock frequency and generate a flag signal indicating said time margin violation;
wherein the adaptive frequency scaling circuit is further configured to adjust the variation in the clock frequency applied to the digital domain of the system on chip in response to the flag signal so as to avoid the time margin violation.

2. The system of claim 1, wherein the varying of the clock frequency by the adaptive frequency scaling circuit comprises increasing clock frequency to recover available margin in the digital domain in response to the margin signal and decreasing clock frequency for a recovery operation in response to the flag signal.

3. The system of claim 1, wherein the fail-safe timing sensor is adapted to detect violation of a safe timing margin for the critical path circuit on the SoC digital domain resulting from an increase in applied clock frequency.

4. The system of claim 1, wherein the fail-safe timing sensor is a critical path end point monitor circuit.

5. The system of claim 4, wherein the critical path end point monitor circuit comprises:
   a clock input;
   a data input;
   a first delay coupled to the clock input to generate a delay clock signal;
   a second delay coupled to the data input to generate a delay data signal;
   a window generator coupled to receive the clock input and delay clock signal and configured to generate a timing window; and
   a transition detector coupled to receive the delay data signal and timing window and configured to generate the flag signal in response to the delay data signal changing state within the timing window.

6. A system, comprising:
   a system on chip (SoC) having a digital domain;
   an adaptive frequency scaling circuit including a critical path replica circuit with respect to the digital domain, the critical path replica circuit configured to generate a margin signal, the adaptive frequency scaling circuit configured to vary a clock frequency applied to the digital domain of the system on chip in response to the margin signal; and
   a fail-safe timing sensor for a critical path circuit within the digital domain of the system on chip, the timing sensor operable to generate a flag signal;
   wherein the adaptive frequency scaling circuit is further configured to vary the clock frequency applied to the digital domain of the system on chip in response to the flag signal; and
   wherein the critical path circuit within the digital domain includes circuitry with a high speed option, the circuitry with the high speed option for the critical path circuit being enabled in response to the flag signal.

7. The system of claim 6, wherein the high speed option comprises circuitry selected from the group consisting of additional drive capacity and reduced threshold voltage circuitry.

8. The system of claim 6, further including a switch circuit operable responsive to the flag signal to switch between the critical path circuit and circuitry with the high speed option.

9. A process, comprising:
   performing adaptive frequency scaling to increase a clock frequency applied to a digital domain of a system on chip (SoC) in response to margin information provided by a critical path replica circuit;
   sensing timing margin at a critical path circuit within the digital domain of the system on chip;
   generating a flag signal responsive to a sensed violation of a safe timing margin at the critical path circuit resulting from the increase in applied clock frequency; and
   decreasing the clock frequency applied to the digital domain of the system on chip in response to the flag signal.

10. The process of claim 9, wherein increasing comprises increasing the clock frequency to recover available margin in the digital domain and wherein decreasing comprises decreasing the clock frequency for a recovery operation.

11. A process comprising;
    performing adaptive frequency scaling to vary a clock frequency applied to a digital domain of a system on chip (SoC) in response to margin information provided by a critical path replica circuit;
    sensing timing margin within the digital domain of the system on chip;
    generating a flag signal responsive to a sensed violation of a safe timing margin on the SoC digital domain resulting from the variation in applied clock frequency;
    varying the clock frequency applied to the digital domain of the system on chip in response to the flag signal; and
    activating a high speed option of a critical path circuit within the digital domain in response to the flag signal.

12. The process of claim 9, wherein generating the flag signal comprises:
    delaying a clock input to generate a delay clock signal;
    delaying a data input to generate a delay data signal;
    generating a timing window from the clock input and delay clock signal; and
    comparing the delay data signal to the timing window, the flag signal being generated in response to the delay data signal changing state within the timing window.

13. A process for guided fail-safe frequency scaling, comprising:
    monitoring a network of timing sensors in a digital domain, each timing sensor being set with individual timing margins;
    determining a violation of said timing margins and generating a flag signal in response thereto; and
    applying a frequency scaling direction and adjustment step size in response to the flag signal, wherein the frequency scaling direction and adjustment step size are set for a recovery operation uniquely associated with each of the timing sensors in the digital domain;
    wherein determining the violation comprises:
       delaying a clock input to generate a delay clock signal;
       delaying a data input to generate a delay data signal;
       generating a timing window from the clock input and delay clock signal; and
       comparing the delay data signal to the timing window to determine whether to generate the flag signal in response to the delay data signal changing state within the timing window.

14. The process of claim 13, wherein the individual timing margins of each timing sensor are defined by certain timing windows and signal edge transition conditions.

15. The process of claim 13, wherein applying frequency scaling direction and adjustment step size comprises locally applying scaling within a portion of the digital domain associated with the timing sensor which generated the flag signal.

16. The process of claim 13, wherein monitoring the network of timing sensors comprises monitoring a plurality of sensors simultaneously.

17. The process of claim 13, wherein monitoring the network of timing sensors comprises monitoring a plurality of sensors in a temporally sequential manner.

18. The process of claim 17, wherein monitoring and applying comprise:
    first determining if a timing margin of a first timing sensor having an individual timing margin set by a first timing window has been violated;
    if not, applying a first frequency scaling direction and adjustment step size for a first delay period before repeating the step of first determining;

if so, second determining if a timing margin of a second timing sensor having an individual timing margin set by a second timing window has been violated; and if not, applying a second frequency scaling direction and adjustment step size for a second delay period before repeating the step of second determining.

19. A system, comprising:

a system on chip (SoC) having a digital domain;

an adaptive frequency scaling circuit including a critical path replica circuit with respect to the digital domain, the critical path replica circuit configured to generate a margin signal, the adaptive frequency scaling circuit configured to vary a clock frequency applied to the digital domain of the system on chip in response to the margin signal; and a fail-safe timing sensor for a critical path circuit within the digital domain of the system on chip, the timing sensor configured to generate a flag signal;

wherein the adaptive frequency scaling circuit varies the clock frequency applied to the digital domain of the system on chip in response to the flag signal; and wherein the digital domain includes a critical path circuit with a high speed option enabled in response to the flag signal, the high speed option comprising circuitry selected from the group consisting of additional drive capacity and reduced threshold voltage circuitry.

20. A system, comprising:

a system on chip (SoC) having a digital domain;

an adaptive frequency scaling circuit including a critical path replica circuit with respect to the digital domain, the critical path replica circuit configured to generate a margin signal, the adaptive frequency scaling circuit configured to vary a clock frequency applied to the digital domain of the system on chip in response to the margin signal; and a fail-safe timing sensor for a critical path circuit within the digital domain of the system on chip, the timing sensor configured to generate a flag signal;

wherein the adaptive frequency scaling circuit varies the clock frequency applied to the digital domain of the system on chip in response to the flag signal;

wherein the digital domain includes a critical path circuit with a high speed option, the high speed option for the critical path circuit being enabled in response to the flag signal; and wherein the system further comprises a switch circuit operable responsive to the flag signal to switch between the critical path circuit and circuitry with the high speed option.

* * * * *